US012794300B2

(12) United States Patent
Dieterich et al.

(10) Patent No.: US 12,794,300 B2
(45) Date of Patent: Nov. 10, 2026

(54) CONNECTION UNIT FOR A STATOR, STATOR FOR AN ELECTRIC MACHINE, STATOR ARRANGEMENT, METHOD FOR PRODUCING A STATOR ARRANGEMENT, AND ELECTRIC MACHINE FOR DRIVING A VEHICLE

(71) Applicant: Valeo eAutomotive Germany GmbH, Erlangen (DE)

(72) Inventors: Sebastian Dieterich, Bad Neustadt a.d.Saale (DE); Bianca Hofmann, Bad Neustadt a.d.Saale (DE); Michael Menz, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 138 days.

(21) Appl. No.: 18/257,153

(22) PCT Filed: Nov. 29, 2021

(86) PCT No.: PCT/EP2021/083344
§ 371 (c)(1),
(2) Date: Jun. 13, 2023

(87) PCT Pub. No.: WO2022/128426
PCT Pub. Date: Jun. 23, 2022

(65) Prior Publication Data

US 2024/0030772 A1 Jan. 25, 2024

(30) Foreign Application Priority Data

Dec. 15, 2020 (DE) ..................... 10 2020 215 908.4

(51) Int. Cl.
*H02K 15/33* (2025.01)
*H02K 3/50* (2006.01)

(52) U.S. Cl.
CPC ............... *H02K 3/50* (2013.01); *H02K 15/33* (2025.01)

(58) Field of Classification Search
CPC ...................................................... H02K 15/33
(Continued)

(56) References Cited

U.S. PATENT DOCUMENTS 5,465,016 A * 11/1995 Mancl .................... H02K 5/225 310/249
5,613,529 A * 3/1997 Tanaka .................. H02K 15/30 140/71 R
(Continued)

FOREIGN PATENT DOCUMENTS

CN 109075647 A 12/2018
DE 102016105179 A1 9/2016
(Continued)

OTHER PUBLICATIONS

International Search Report issued Mar. 3, 2022 in PCT/EP2021/083344 filed on Nov. 29, 2021, 2 pages.
(Continued)

*Primary Examiner* — Alexander Talpalatski
(74) *Attorney, Agent, or Firm* — Oblon, McClelland, Maier & Neustadt, L.L.P.

(57) ABSTRACT

Connection unit for a stator having a stator winding with N number of phases. The connection unit includes a number N of contact portions each having a first wall and a second wall, and each contact portion forming a receiving chamber delimited by the first wall and the second wall and designed to encase one of N connection portions of the stator. Each contact portion is configured to electrically contact the connection portion, wherein the first and second walls of the N contact portions are oriented parallel to one other. A conductor arrangement which either electrically conduc-
(Continued)

tively connects the contact portions or includes N conductor portions which are electrically isolated from one another and are each electrically conductively connected to one of the N contact portions.

13 Claims, 7 Drawing Sheets

(58) Field of Classification Search
USPC .......................................................... 310/71
See application file for complete search history.

(56) References Cited

U.S. PATENT DOCUMENTS

| | | | | |
|---|---|---|---|---|
| 6,091,172 | A * | 7/2000 | Kakinuma | H02K 11/40 310/194 |
| 6,300,698 | B1 * | 10/2001 | Fargo | H01R 39/32 310/91 |
| 10,050,483 | B2 * | 8/2018 | Sambuichi | H02K 15/33 |
| 2009/0026859 | A1 | 1/2009 | Kinoshita et al. | |
| 2016/0149454 | A1 * | 5/2016 | Haga | H02K 3/28 310/71 |
| 2016/0190887 | A1 | 6/2016 | Sambuichi et al. | |
| 2016/0218578 | A1 | 7/2016 | Yamada et al. | |
| 2018/0097416 | A1 | 4/2018 | Dang | |
| 2019/0149003 | A1 | 5/2019 | Ishikawa et al. | |
| 2021/0044184 | A1 * | 2/2021 | Guardiola | H02K 3/38 |

FOREIGN PATENT DOCUMENTS

| | | | |
|---|---|---|---|
| DE | 102019122550 | A1 | 2/2020 |
| DE | 102018009206 | B3 | 3/2020 |
| EP | 3 051 671 | B1 | 11/2018 |
| FR | 3 054 745 | A1 | 2/2018 |

OTHER PUBLICATIONS

European Office Action dated Mar. 2, 2026 in European Patent Application No. 21823505.9, 11 pages.

* cited by examiner

CONNECTION UNIT FOR A STATOR, STATOR FOR AN ELECTRIC MACHINE, STATOR ARRANGEMENT, METHOD FOR PRODUCING A STATOR ARRANGEMENT, AND ELECTRIC MACHINE FOR DRIVING A VEHICLE

The present invention relates to a connection unit for a stator having a stator winding comprising a number N of phases. In addition, the invention relates to a stator for an electric machine, a stator arrangement, a method for producing a stator arrangement and an electric machine for driving a vehicle.

Connection units for a stator with a stator winding having N phases are used for connecting connection portions of the stator winding. For this, the connection unit comprises a number of contact portions corresponding to the number of phases, and a conductor arrangement. The contact portions each have a receiving chamber, which is delimited by two walls and which encases one of the connection portions.

In order to form a star point, the conductor arrangement may connect the contact portions together in an electrically conductive fashion. Thus DE 10 2019 122 550 A1 discloses an electric machine with a stator core and hairpins, which are connected together to form windings and to form a continuous circuit between a terminal end and a neutral end. A neutral connection is arranged at each of the neutral ends and comprises an arcuate body with an inside and an outside. The inside defines open slots, wherein each of the slots receives one of the neutral ends.

If the connection portions are oriented radially, corresponding to the substantially cylindrical design of the stator, it is difficult to arrange the connection portions in the receiving chambers, in particular since certain production-related positional tolerances of the connection portions may exist.

The invention is based on the object of specifying an installation-friendly option for connecting connection portions of a stator.

According to the invention, this object is achieved with a connection unit for a stator which comprises a stator winding with a number N of phases, having: a number N of contact portions, wherein each contact portion has a first wall and a second wall, each contact portion forms a receiving chamber delimited by the first wall and the second wall and designed to encase one of N connection portions of the stator, and each contact portion is configured to electrically conductive contact the connection portion, wherein the first and second walls of the N contact portions are oriented parallel to one another; and a conductor arrangement which either electrically conductively connects the contact portions or comprises N conductor portions which are electrically isolated from one another and are each electrically conductively connected to one of the N contact portions.

The connection unit according to the invention for a stator having a stator winding comprising a number N of phases comprises a number N of contact portions. Each contact portion has a first wall and a second wall. Each contact portion forms a receiving chamber. The receiving chamber is delimited by the first wall and the second wall. The receiving chamber is furthermore designed to encase one of the N connection portions of the stator. Each contact portion is configured to electrically conductive contact the connection portion. The first and second walls of the N contact portions are oriented parallel to one another. The connection unit furthermore has a conductor arrangement. According to a first alternative, the conductor arrangement electrically conductively connects the contact portions. According to a second alternative, the conductor arrangement comprises N conductor portions. The conductor portions are electrically isolated from one another. The conductor portions are furthermore each electrically conductively connected to one of the N contact portions.

The connection unit according to the invention is distinguished in particular in that the walls of the N contact portions are oriented parallel to one another. This allows the connection unit to be brought by a linear movement into a position in which the connection portions are arranged in the receiving chambers. A stator suitable for this, which will be described in detail below, accordingly has connection portions, which are correspondingly oriented in parallel.

The linear movement quite substantially facilitates the arrangement of the connection portions in the contact portions and can easily be automated. In particular, no additional tools are required for holding the connection portions in a predefined position, as would be necessary for attaching a conventional connection unit to the connection portions. In addition, positional tolerances of the connection portions can easily be compensated by the connection unit when the connection portions are situated in the receiving chambers. Advantageously, mounting of a stator arrangement or electric machine comprising the connection unit and the stator can be considerably simplified.

Adjacent pairs of contact portions are preferably arranged equidistantly.

In a preferred embodiment, the contact portions are configured as recesses of the conductor arrangement. The recesses are delimited by the first wall and the second wall.

In a preferred embodiment, the connection unit extends substantially in one plane. The first wall and the second wall extend at least in one direction perpendicular to this plane.

It is furthermore preferred that the contact portions each have a guide which is widened relative to a distance between the first wall and the second wall. In this way, the connection portions can easily be inserted into the receiving chambers even if these are not positioned precisely due to production tolerances. Preferably, the guide is configured to adjoin the first wall and the second wall of the contact portion. The guide may have a first wall, which adjoins the first wall of the contact portion and encloses therewith an in particular obtuse angle. The guide may have a second wall, which adjoins the second wall of the contact portion and encloses therewith an in particular obtuse angle. The first wall and the second wall of the guide may extend along straight lines, which enclose an acute angle, in particular an angle between 40 and 80 degrees.

In addition, in the connection unit according to the invention, it may be provided that the contact portions each have a third wall, which connects the first wall and the second wall and delimits the receiving chamber. In particular, with respect to the linear movement, the third wall may form a stop for the connection portion to be received in the receiving chamber. The third wall preferably runs perpendicularly to the first wall and to the second wall.

Advantageously, the contact portions may be arranged next to one another in the plane in which the connection unit extends, and the first, second and third walls may extend at least in one direction perpendicular to this plane.

Preferably, the conductor arrangement of the connection unit is configured as a busbar when the conductor arrangement electrically conductively connects the contact portions. If the conductor arrangement comprises the conductor portions, a respective conductor portion may be configured as a busbar.

Preferably, the connection unit according to the invention furthermore comprises an isolation body, which is arranged, in particular moulded, on the conductor arrangement and comprises openings exposing the contact portions. The isolation body may be formed by a sheath surrounding the conductor arrangement in portions and/or continuously. The isolation body is preferably formed by extrusion-coating the conductor arrangement. The isolation body may furthermore establish relative positions of the conductor portions.

In addition, the connection unit according to the invention may have a fastening portion which is designed to engage with a fastening portion of a further connection unit such that the connection unit and the further connection unit can be transferred from a detached position into a fastened position, in which the connection unit and the further connection unit are fastened together and the conductor arrangement of the connection unit and a conductor arrangement of the further connection unit are electrically isolated from one another. All statements relating to the connection unit according to the invention may be transferred to the further unit.

In the fastened position, the contact portions of the connection unit and the further connection unit are contacted by the connection portions of the stator winding. This enables the connection portions to be fastened to the connection units, for example by welding, without additional tools for positioning the connection portions. In this way, the ease of mounting may be further increased.

The fastening portion may form a latching element, which is designed to engage with a latching element of the fastening portion of the further connection unit in the fastened position so as to form a latching connection. The latching connection here enables a simple mutual fastening of the connection units without additional tools. The latching element may be designed to be elastically deformed during the transition from the detached position to the fastened position. It is possible that the fastening portion furthermore forms one or more further corresponding latching elements.

Alternatively or additionally, it may be provided that the fastening portion forms a protrusion or a recess, wherein the protrusion may correspond to a fastening portion formed as a recess of the further connection unit, or the recess may correspond to a fastening portion formed as a protrusion of the further connection unit. In the fastened position, the fastening portions may intermesh in a form-fit connection. The protrusion and the recess preferably correspond to one another. The fastening portion may comprise one or more further protrusions and recesses.

The isolation body of the connection unit according to the invention preferably forms the fastening portion. Here it may be provided that the isolation body or the conductor arrangement of the further connection unit forms its fastening portion.

Alternatively, the conductor arrangement of the connection unit according to the invention forms the fastening portion. Here it may be provided that the isolation body of the further connection unit forms its fastening portion.

The object on which the invention is based is furthermore achieved by a stator for an electric machine, having a stator core with an axial end face and a stator winding which has a number N of phases and is formed sectional from shaped conductors extending through the stator core and from first to Nth connection portions which at the end face adjoin a part of the shaped conductors, are situated at different angular positions of a circumferential direction and extend in the axial direction, and are configured either to form a star point or to form connections for the phases, wherein the connection portions have a pair of parallel side faces, wherein the first (N−1)th connection portions are deformed relative to the Nth connection portion such that the pair of parallel side faces of the first to the Nth connection portions are oriented substantially parallel, in particular parallel, to one another.

The stator according to the invention for an electric machine has a stator core. The stator core has an axial end face. The stator furthermore has a stator winding. The stator winding comprises a number N of phases. The stator winding is formed, in part, by shaped conductors. The shaped conductors extend through the stator core. The stator winding is furthermore formed sectional from first to Nth connection portions. At the end face, the first to Nth connection portions adjoin a part of the shaped conductors. The first to the Nth connection portions are situated at different angular positions of a circumferential direction and extend in the axial direction. The first to the Nth connection portions are designed either to form a star point or to form connections for the phases. The connection portions have a pair of parallel side faces. The first to the (N−1)th connection portions are deformed relative to the Nth connection portion such that the pair of parallel side faces of the first to the Nth connection portions are oriented substantially parallel, in particular parallel, to one another.

The stator according to the invention is distinguished in particular in that the first to the Nth connection portions are oriented similarly, so that their pairs of parallel sides are oriented substantially parallel to one another. This allows the arrangement of the connection unit according to the invention by the linear movement running in particular perpendicular or parallel to the extent direction of the connection portions.

The stator core is preferably formed by a plurality of mutually isolated stator laminations. A multiplicity of slots, which are arranged along the circumferential direction and extend from the end face to an axially opposite further end face, may be formed in the stator core. The shaped conductors may be received in the slots.

The shaped conductors are preferably formed by rods made of an electrically conductive metal, in particular copper. The shaped conductors are preferably arranged, radially layered in a respective slot, with a predetermined even number of layers, in particular four, six, eight, ten or twelve layers. The number of strands typically corresponds to a number of phases of the stator. N may be greater than or equal to three, preferably is precisely three.

The stator winding may be configured as a hairpin winding. At the first end face and at a second end face axially opposite the first end face, the shaped conductors of a respective phase may be electrically connected together by connectors so as to form a series circuit or multiple series circuits. Preferably, connectors of the first type are formed integrally with the shaped conductors at the first end face. At the second end face, pairs of shaped conductors may be electrically conductively connected by connectors of the second type. The connectors of the second type may each have two connecting portions, which in particular integrally adjoin the shaped conductors of the pair. The connecting portions may be electrically conductively connected together in pairs, in particular by substance bonding.

Each connection portion may comprise multiple connection elements, which each adjoin one of the shaped conductors. Preferably, each connection portion has a connection element for each series circuit of the phase.

If the first to the Nth connection portions are designed to form a star point, it is preferred that the stator winding is furthermore formed sectional from (N+1)th to (2N)th connection portions which at the end face adjoin a part of the shaped conductors, extend in the axial direction at different angular positions of a circumferential direction, and are configured to form connections for the phases, wherein the (N+1)th to (2N)th connection portion has a pair of parallel side faces, wherein the (N+1)th to (2N−1)th connection portions are deformed relative to the (2N)th connection portion such that the pairs of parallel side faces of the (N+1)th to (2N)th connection portions are oriented substantially parallel, in particular parallel, to one another. Thus a connection unit according to the invention can also connect to the (N+1)th to (2N)th connection portions.

The pairs of parallel sides of the first to (2N)th connection portions may be oriented parallel to one another. It is however preferred that the pairs of parallel side faces of the first to Nth connection portions firstly, and the pairs of parallel side faces of the (N+1)th to (2N)th connection portions secondly, are oriented differently, in particular enclose an angle of greater than zero.

In a preferred embodiment, the connection portions are deformed by twisting around an axis parallel to a longitudinal axis of the stator. For this, the first to (N1)th connection portions and/or (N+1)th to (2N−1)th connection portions have a torsion portion which forms the twist.

The object on which the invention is based is furthermore achieved by a stator arrangement comprising: a stator according to the invention and a connection unit according to the invention, wherein the first to the Nth connection portions are each received in the receiving chamber of a contact portion of the connection unit.

It may furthermore be provided that the conductor arrangement of the first connection unit electrically conductively connects the contact portions to form a star point, wherein the stator arrangement furthermore comprises: a second connection unit according to the invention, the conductor arrangement of which comprises N conductor portions which are electrically isolated from one another and each electrically conductively connected to one of the N contact portions so as to form a connection for one of the phases, wherein the (N+1)th to the (2N)th connection portions are each received in the receiving chamber of a contact portion of the second connection unit.

In the stator arrangement according to the invention, it is preferred that a fastening means is provided via which the first connection unit and the second connection unit can be transferred from a detached position into a fastened position, in which the first connection unit and the second connection unit are fastened together and the conductor arrangement of the first connection unit and the conductor arrangement of the second connection unit are electrically isolated from one another.

The fastening means may be formed by the fastening portions of the first and second connection units. The connection unit described as the further connection unit in relation to the connection unit according to the invention may be the second connection unit of the stator arrangement.

Alternatively, the fastening means may be designed to force the first connection portion and the second connection portion together into the fastened position as a result of a force acting on the first connection unit and the second connection unit, so that the connection portions of the stator can be fastened to the contact portions in an electrically conductive manner, in particular by a substance-bonded joining process. In this configuration, the fastening means is therefore provided as an additional component, which is separate from the connection units. The fastening means is preferably designed such that it can be detached from the connection units in the fastened position, and preferably moved back into the detached position.

The object on which the invention is based is furthermore achieved by a method for producing a stator arrangement, comprising the following steps: provision of a connection unit according to the invention, provision of a stator according to the invention, and arrangement of the first to the Nth connection portions of the stator in the receiving chambers of the contact portions of the connection unit. The arrangement may take place by performing a relative movement of the connection unit along a movement direction running substantially perpendicular or parallel, in particular perpendicular or parallel, to an extent direction of the connection portions.

In the method according to the invention, it may furthermore be provided that the conductor arrangement of the first connection unit electrically conductively connects the contact portions so as to form a star point. The method may furthermore comprise the following steps: provision of a second connection unit according to the invention, the conductor arrangement of which comprises N conductor portions which are electrically isolated from one another and each electrically conductively connected to one of the N contact portions in order to form a connection for one of the phases; arrangement of the (N+1)th to the (2N)th connection portions of the stator in the receiving chamber of a respective contact portion of the second connection unit. The arrangement may take place by performing a relative movement of the second connection unit along a movement direction running substantially perpendicular or parallel, in particular perpendicular or parallel, to an extent direction of the connection portions.

Furthermore, the following step may be provided: joining of the connection portions and the contact portions, in particular so as to form substance-bonded joint connections. Preferably, the joining takes place by means of welding.

Also, the following step may be provided: transfer of the first connection unit and the second connection unit from a detached position into a fastened position by means of a fastening means or by means of fastening portions formed by the connection units, wherein in the fastened position, the first connection unit and the second connection unit are fastened together and the conductor arrangement of the first connection unit and the conductor arrangement of the second connection unit are electrically isolated from one another.

In particular, if the fastening means is not formed by the connection units, furthermore a step may be provided of removing the fastening means by transfer from the fastened position into the detached position after joining of the connection portions and the contact portions.

All statements relating to the connection unit according to the invention and to the stator according to the invention may be transferred accordingly to the method according to the invention, so that the above-mentioned advantages can also be achieved with said method.

The object on which the invention is based is furthermore achieved by an electric machine for driving a vehicle, comprising: a stator arrangement according to the invention or a stator arrangement obtained using the method according to the invention, and a rotor rotatably mounted within the stator.

The electric machine is preferably designed as a synchronous machine or asynchronous machine. The rotor is preferably permanently excited.

Further advantages and details of the present invention are derived from the exemplary embodiments described below and from the drawings. The drawings are schematic illustrations in which.

Figure 6:
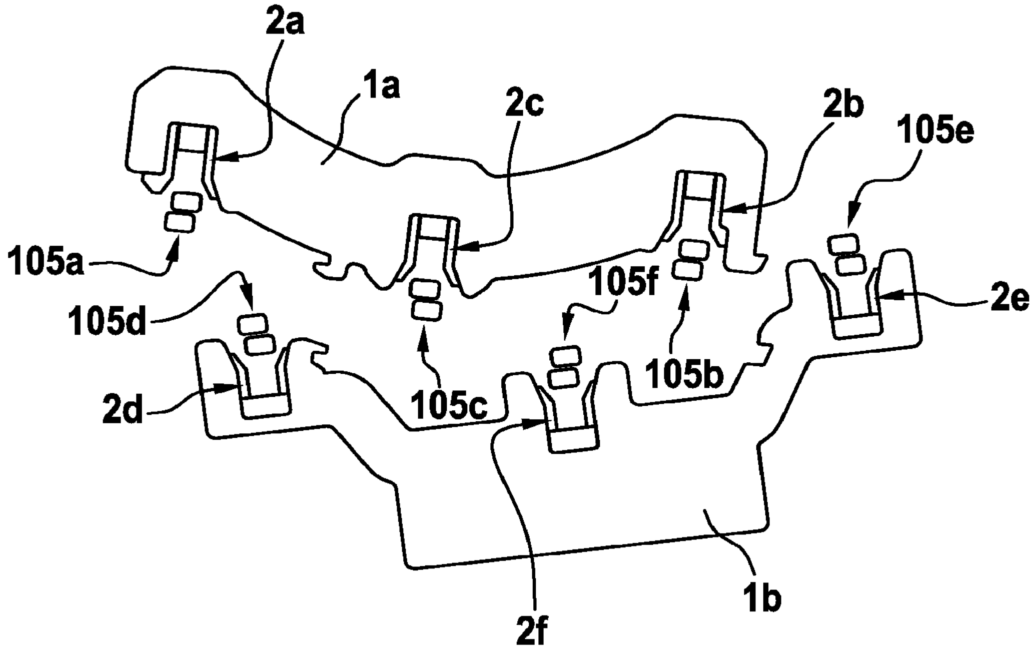
Figure 7:
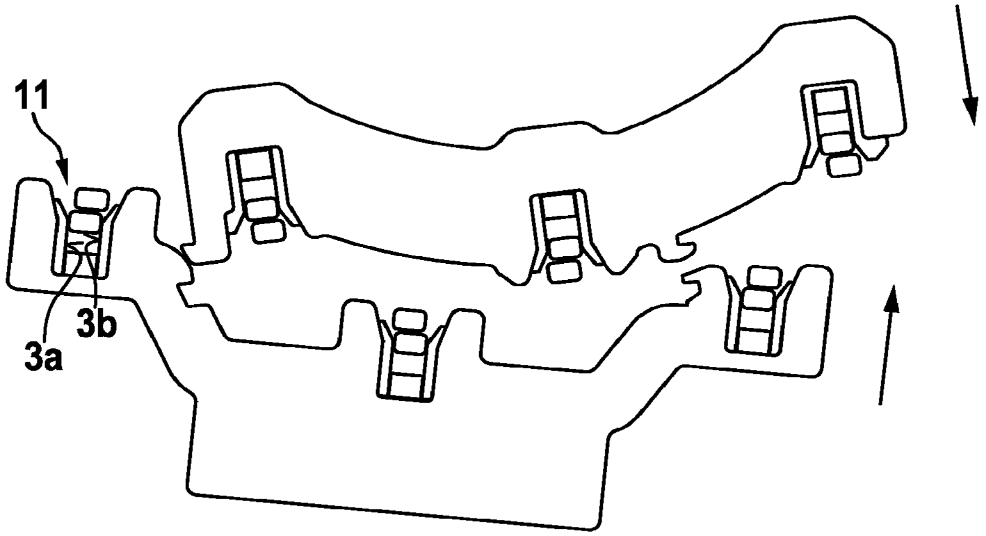
Figure 8:
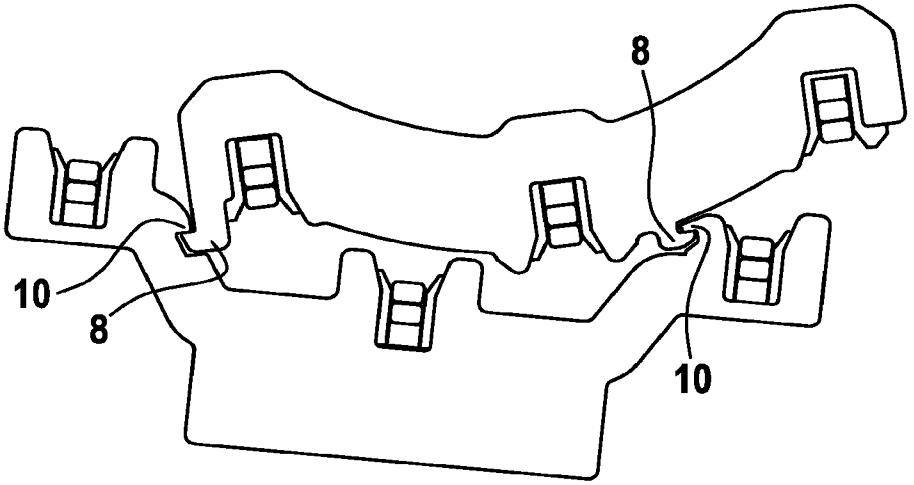
Figure 9:
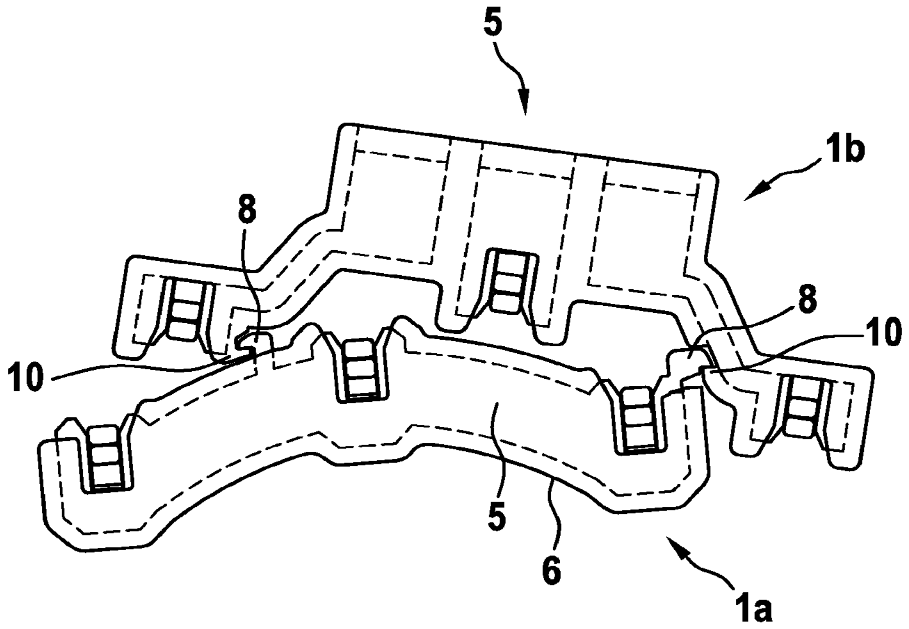
Figure 10:
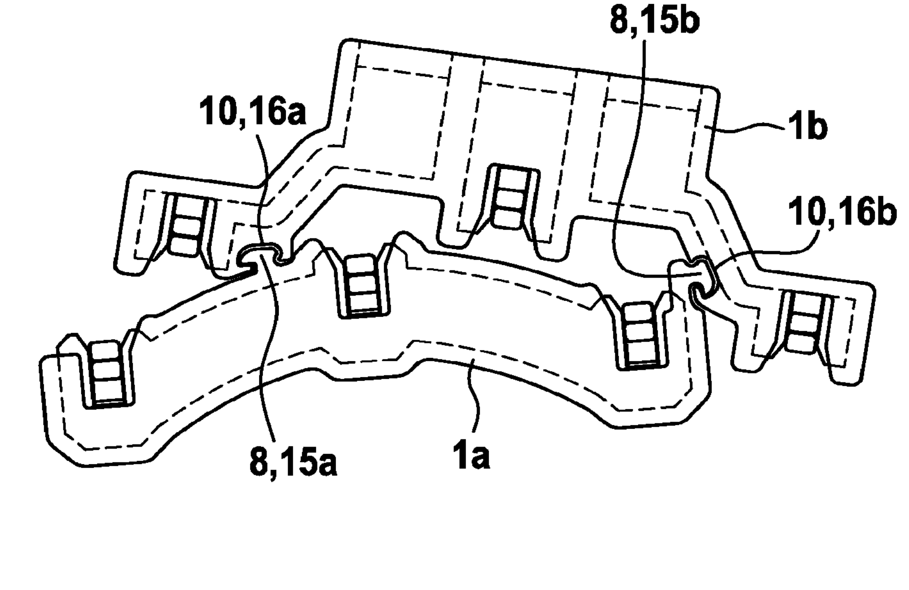
Figure 11:
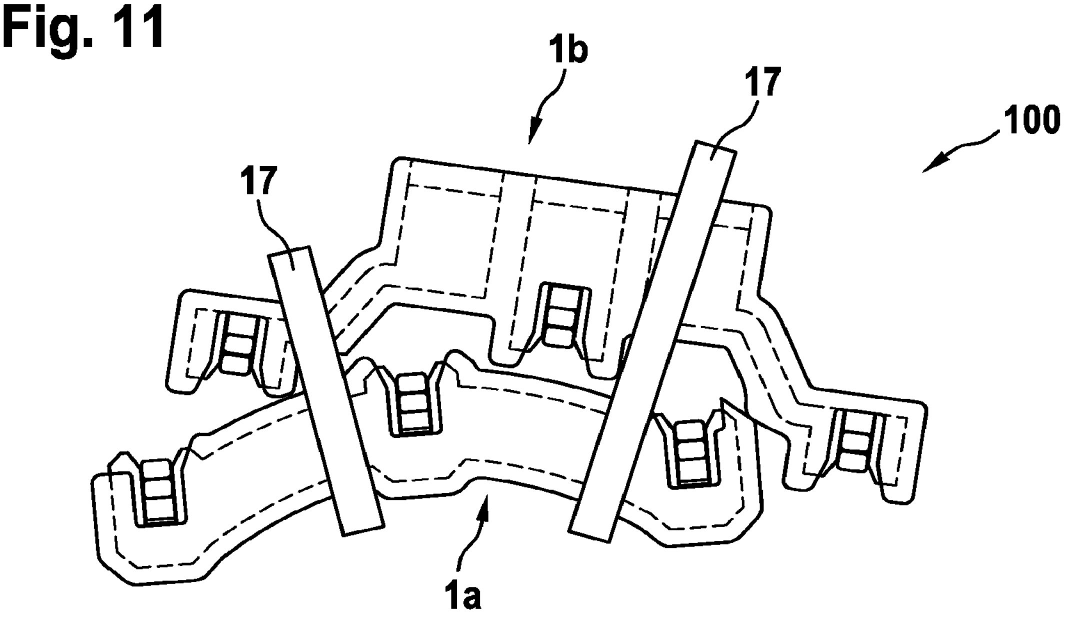
Figure 12:
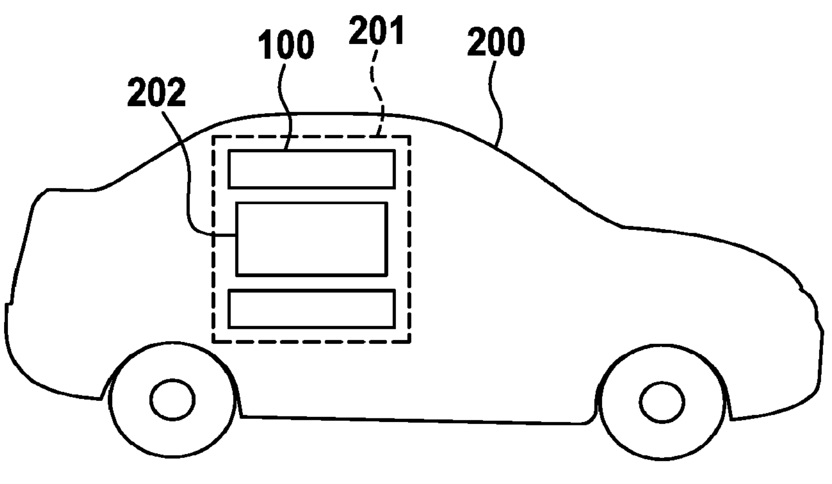

FIGS. 6 to 8 each show a plan view of the connection units on transition from a detached position to a fastened position;

FIG. 9 shows a plan view of a third exemplary embodiment of the connection unit according to the invention;

FIG. 10 shows a plan view of a fourth and a fifth exemplary embodiment of the connection unit according to the invention;

FIG. 11 shows a plan view of a further exemplary embodiment of the stator arrangement according to the invention with a sixth and a seventh exemplary embodiment of the connection unit according to the invention; and FIG. 12 shows a basic diagram of a vehicle having an exemplary embodiment of the electric machine according to the invention.

Figure 1:
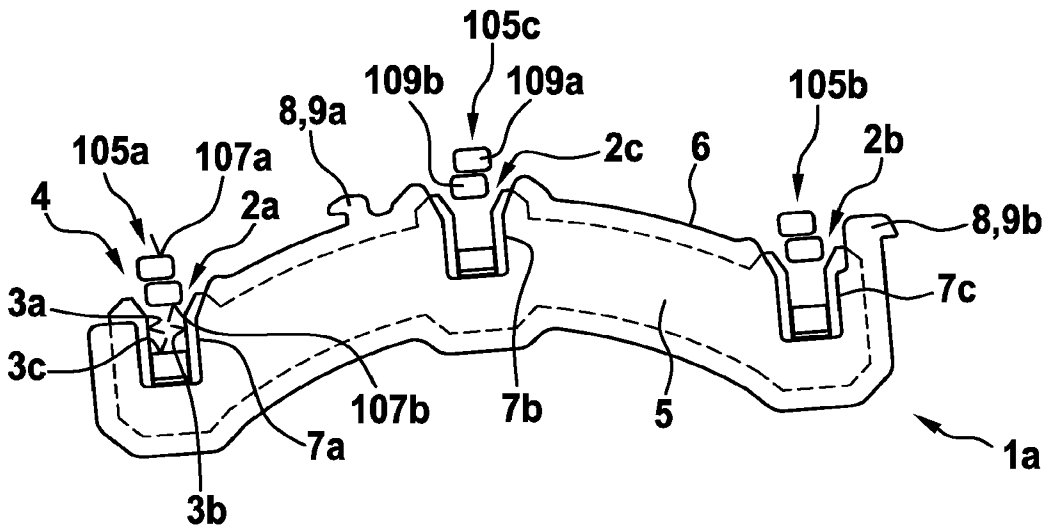
FIG. 1 shows a plan view of a first exemplary embodiment of the connection unit according to the invention.

FIG. 1 is a plan view of a first exemplary embodiment of a connection unit 1*a*.

The connection unit 1*a* has three contact portions 2*a*, 2*b*, 2*c*. Each contact portion 2*a*, 2*b*, 2*c* has a first wall 3*a* and a second wall 3*b*, which in FIG. 1 carry reference signs on the contact portion 2*a* as representative of the contact portions 2*b*, 2*c*. Each contact portion 2*a*, 2*b*, 2*c* forms a receiving chamber 4 which is designed to encase one of three connection portions 105*a*, 105*b*, 105*c* of a stator 101 (see FIG. 4) and is delimited by the first wall 3*a* and the second wall 3*b*. The walls 3*a*, 3*b* of all contact portions 2*a*, 2*b*, 2*c* are oriented parallel to one another. In addition, each contact portion 2*a*, 2*b*, 2*c* has a third wall 3*c* which runs perpendicular to the first wall 3*a* and the second wall 3*b* and also delimits the receiving chamber.

In addition, the connection unit 1*a* has a conductor arrangement 5, which electrically conductively connects the contact portions 2*a*, 2*b*, 2*c*. For this, the conductor arrangement 5 is formed as an e.g. arcuate or crescent-shaped busbar. The contact portions 2*a*, 2*b*, 2*c* are formed as recesses in the conductor arrangement 5 or busbar.

The connection unit 1*a* furthermore comprises an isolation body 6 which is arranged on the conductor arrangement 5, and comprises openings 7*a*, 7*b*, 7*c* exposing the contact portions 2*a*, 2*b*, 2*c*. In the present exemplary embodiment, the isolation body 6 is moulded on the conductor arrangement 5 and formed by a cohesive sheath surrounding the conductor arrangement 5 in portions. The isolation body 6 is made of an electrically conductive material, e.g. a plastic.

FIG. 1 furthermore shows a fastening portion 8 of the connection unit 1*a*. The fastening portion 8 is here formed for example by two latching elements 9*a*, 9*b*. The fastening portion 8 is designed to engage with a fastening portion 10 of a further connection unit 1*b* (see FIG. 3) such that the connecting unit 1*a* and the further connection unit 1*b* can be transferred from a detached position into a fastened position. In the fastened position, the connection unit 1*a* and the further connection unit 1*b* are fastened together, and the conductor arrangement 5 of the connection unit 1*a* and a conductor arrangement 5 (see FIG. 3) of the further connection unit 1*b* are electrically isolated from one another. The fastening portion 8 is formed by the isolation body 6.

Figure 2:
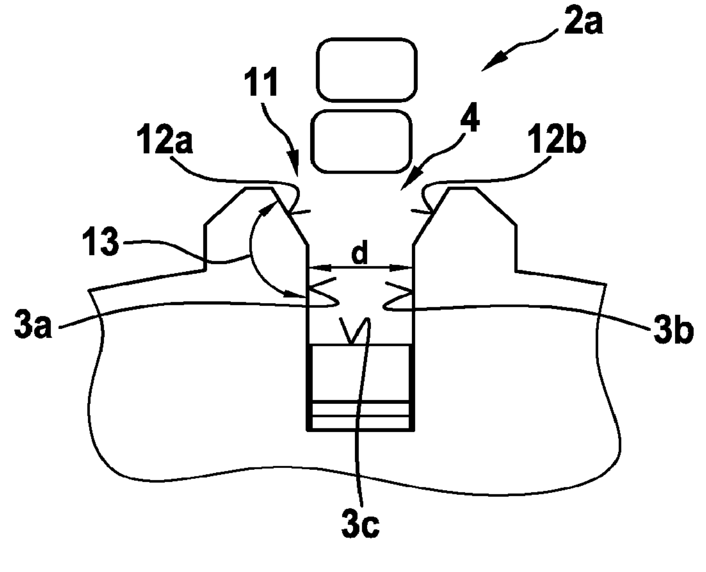
FIG. 2 shows a detail view of a contact portion of the connection unit according to the first exemplary embodiment.

FIG. 2 shows a detail view of the contact portion 2*a*, which is representative of the further contact portions 2*b*, 2*c*.

The contact portion 2*a* has a guide 11, which is widened, relative to a distance d between the first wall 3*a* and the second wall 3*b*. The guide 11 here adjoins the first wall 3*a* and the second wall 3*b* on a side of the first wall 3*a* and of the second wall 3*b* opposite the third wall 3*c*. The guide 11 itself has a first wall 12*a* and a second wall 12*b*. The first wall 12*a* of the guide 11 adjoins the first wall 3*a* of the contact portion 2*a* at a side opposite the third wall 3*c*. The second wall 12*b* of the guide 11 adjoins the second wall 3*b* of the contact portion 2*a* at the side opposite the third wall 3*c*. The first wall 12*a* and the first wall 3*a* enclose an obtuse angle 13. Similarly, the second wall 3*b* and the second wall 12*b* enclose an obtuse angle. The walls 12*a*, 12*b* of the guide 11 each extend along a straight line. The straight lines intersect at an acute angle of around 60 degrees.

Figure 3:
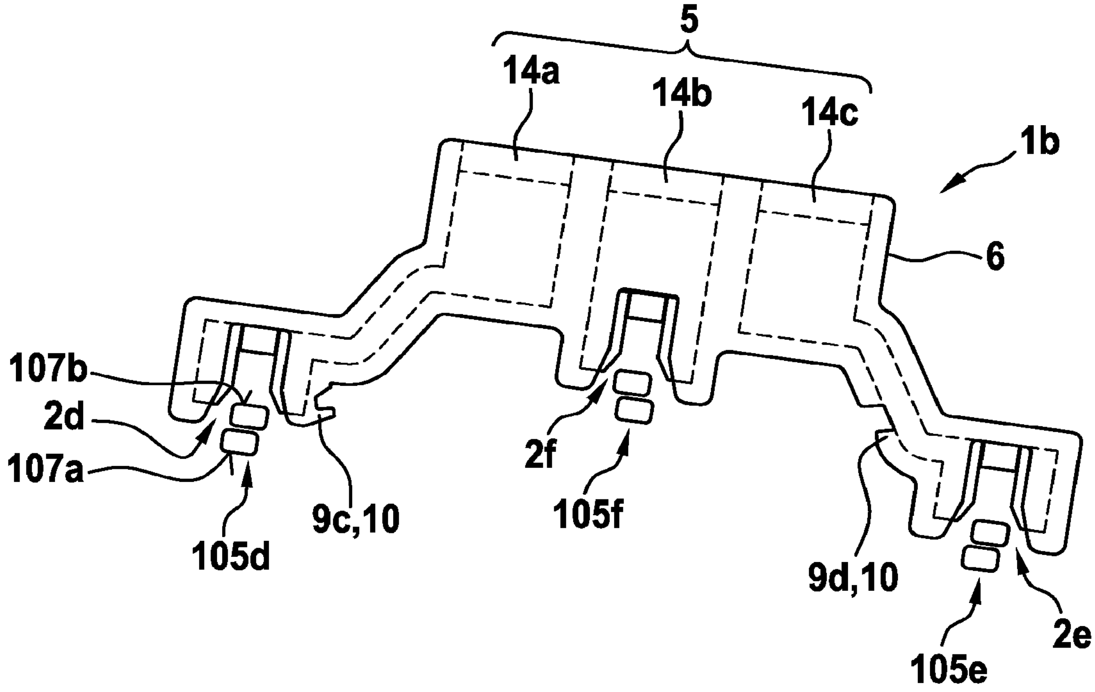
FIG. 3 shows a plan view of a second exemplary embodiment of the connection unit according to the invention.

FIG. 3 is a plan view of a second exemplary embodiment of a connection unit 1*b*. Unless specified otherwise below, all statements pertaining to the first exemplary embodiment can be applied to the second exemplary embodiment.

In the second exemplary embodiment, the conductor arrangement 5 is formed by a number of conductor portions 14*a*, 14*b*, 14*c* corresponding to the number of contact portions 2*d*, 2*e*, 2*f*. The conductor portions 14*a*, 14*b*, 14*c* are electrically isolated from one another and each electrically conductively connected to one of the contact portions 2*d*, 2*e*, 2*f*. In the second exemplary embodiment, each conductor portion 14*a*, 14*b*, 14*c* is formed by a busbar. The isolation body 6 isolates the conductor portions 14*a*, 14*b*, 14*c* from one another and establishes the relative positions of the conduct portions 14*a*, 14*b*, 14*c*.

The connection unit 1*b* according to the second exemplary embodiment also has a fastening portion 10, which is formed by latching elements 9*c*, 9*d*.

Figure 4:
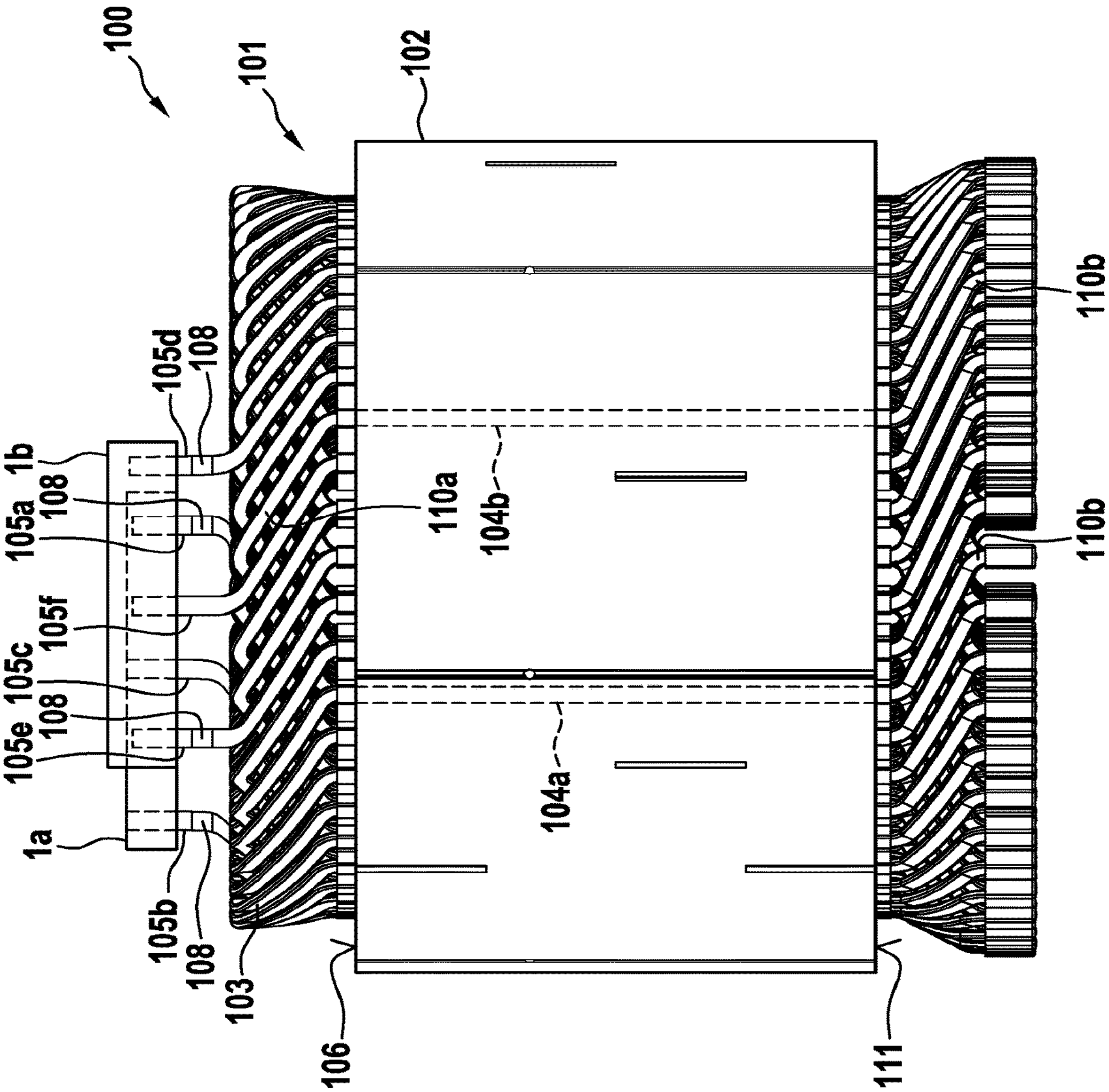
FIG. 4 shows a side view of an exemplary embodiment of the stator arrangement according to the invention with an exemplary embodiment of the stator according to the invention and the first and second exemplary embodiments of the connection unit.

FIG. 4 is a side view of an exemplary embodiment of a stator arrangement 100. The stator arrangement 100 has a stator 101, a first connection unit 1*a* according to the first exemplary embodiment, and a second connection unit 1*b* according to the second exemplary embodiment.

The stator 101 has a stator core 102 which is here formed for example from a plurality of axially layered stator laminations, which are electrically isolated from one another and made from a soft magnetic material. In addition, the stator 101 has a stator winding 103, which is configured as a hairpin winding. The stator winding 103 has for example three phases and is formed sectional by shaped conductors 104*a*, 104*b*, which extend through the stator core 102. The stator winding 103 is furthermore formed sectional by the first to the sixth connection portions 105*a* to 105*f*, which extend in the axial direction at a first end face 106 of the stator core 102, adjoining a part of the shaped conductors 104*a*, 104*b* at different angular positions of a circumferential direction.

The first to third connection portions 105*a*, 105*b*, 105*c* are designed to form a star point. The fourth to sixth connection portions 105*d*, 105*e*, 105*f* are each designed to form a connection for the phases. The first to third connection portions 105*a*, 105*b*, 105*c* are arranged for example radially on the inside at the respective angular positions. The fourth to sixth connection portions 105*d*, 105*e*, 105*f* are arranged for example radially on the outside at a respective one of the angular positions.

With reference to FIG. 1 and FIG. 3, a cross-section of a respective connection portion 105*a-f* has two parallel sides. The associated side faces 107*a*, 107*b* extend into the plane of the paper. For reasons of clarity, here only the first connection portion 105*a* in FIG. 1 and the fourth connection portion 105*d* in FIG. 3 carry reference signs. The stator 101 is distinguished in that the first and second connection portions 105*a*, 105*b* are deformed relative to the third connection portion 105*c* such that the pair of parallel side faces 107*a*, 107*b* of the first to third connection portions 105*a*, 105*b*, 105*c* are oriented substantially parallel to one another. Without this deformation, the connection portions 105*a*, 105*b*, 105*c* would be oriented radially because of the substantially cylinder-symmetrical form of the stator 101, so the corresponding pairs of side faces 107*a*, 107*b* would stand not parallel but obliquely to one another, corresponding to their position in the circumferential direction.

Similarly, the fourth and fifth connection portions 105*d*, 105*e* are deformed relative to the sixth connection portion 105*f* such that the pair of parallel side faces 107*a*, 107*b* of the fourth to sixth connection portions 105*d*, 105*e*, 105*f* are oriented substantially parallel to one another. In the present exemplary embodiment, the pairs of parallel side faces 107*a*, 107*b* of all connection portions 105*a-f*, i.e. the first to sixth connection portions 105*a-f*, are not oriented parallel to one another. In other words, the pairs of parallel side faces 107*a*, 107*b* of the first to third connection portions 105*a*, 105*b*, 105*c* firstly, and the pairs of parallel side faces 107*a*, 107*b* of the fourth to sixth connecting portions 105*d*, 105*e*, 105*f* secondly, enclose between them an angle which is greater than zero degrees.

In the present exemplary embodiment, the connection portions 105*a*, 105*b*, 105*d*, 105*e* are deformed by twisting around an axis parallel to a longitudinal axis of the stator. For this, FIG. 4 shows schematically torsion portions 108 in which the course of the connection portions 105*a*, 105*b*, 105*d*, 105*e* has the twist.

In the present exemplary embodiment, for each of the phases, the stator winding 103 has two series circuits of shaped conductors 104*a*, 104*b* which form the parallel paths of the phase. In the present exemplary embodiment, each connection portion 105*a-f* comprises two connection elements 109*a*, 109*b* which, for reasons of clarity, only carry a reference sign at connection portion 105*c* in FIG. 1. A respective connection portion 109*a*, 109*b* integrally adjoins one of the shaped conductors 104*a*, 104*b* on the outside with respect to one of the series circuits.

The stator winding 103 is furthermore formed sectional by a plurality of connectors of the first type 110*a* and connectors of the second type 110*b*. The shaped conductors 104*a*, 104*b* of a respective phase are connected together into the series circuits by the connectors of the first type 110*a* and connectors of the second type 110*b*. The connectors of the first type 110*a* are formed integrally with pairs of shaped conductors 104*a*, 104*b*. At a second end face 111 of the stator core 102 opposite the first end face 106, pairs of shaped conductors 104*a*, 104*b*, which are not connected by connectors of the first type 110*a*, are connected together by connectors of the second type 110*b*. For this, the connectors of the second type have two connecting elements. The connecting elements are each formed integrally with one of the shaped conductors 104*a*, 104*b* connected by the connectors of the second type 110*b*. The connecting elements are connected together by substance bonding, e.g. by welding, at the second end face 111.

Figure 5:
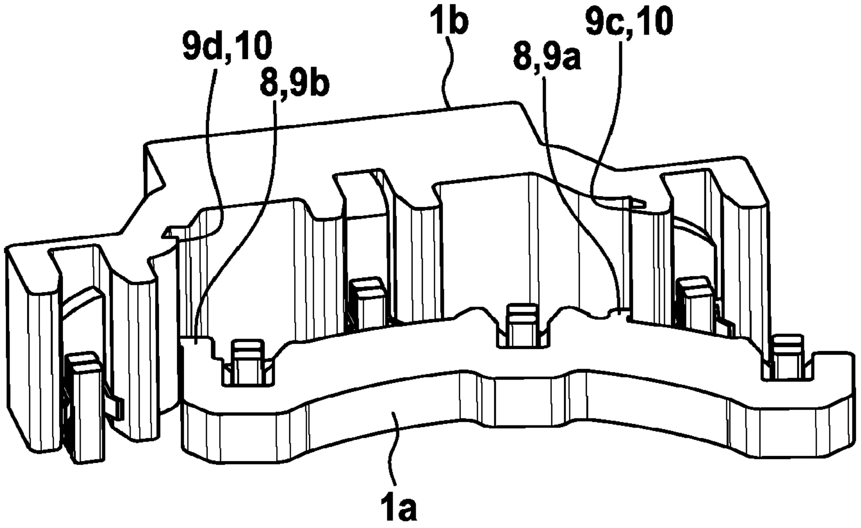
FIG. 5 shows a perspective, detail view of the connection units in the fastened position.

FIG. 5 shows a perspective, detail view of the connection units 1*a*, 1*b* of the stator arrangement 100 in a fastened position.

The fastening portions 8, 10 of the connection units 1*a*, 1*b* are connected by intermeshing in the fastened position, so that the latching elements 9*a*, 9*b* and 9*c*, 9*d* form two latching connections. The fastening portions 8, 10 here constitute a fastening means 17 of the stator arrangement 100.

FIGS. 6 to 8 each show a plan view of the connection units 1*a*, 1*b* on transition from a detached position to the fastened position. With reference to these figures, the advantage of the parallel arrangement of the pairs of parallel side faces 107*a*, 107*b* will be explained.

As shown in FIG. 6, the pairs of parallel side faces 107*a*, 107*b* of the connection portions 105*a*, 105*b*, 105*c* are arranged substantially parallel to one another when they are not yet received in the receiving chambers 4 of the contact portions 2*a*, 2*b*, 2*c*. However, there are certain mutual positioning tolerances of the connection portions 105*a* to 105*c* and of the connection elements 109*a*, 109*b*. The same applies to the connection portions 105*d* to 105*f*.

As FIG. 7 shows, the connection units 1*a*, 1*b* are moved towards one another in a linear movement direction perpendicular to the extent direction of the connection portions 105*a-f*, as indicated by the arrows in FIG. 7. The guides 11 here serve to compensate for the above-mentioned positional tolerances. It should be noted that the connection portions 105*a-f* can be received in the receiving chambers 4 because of the deformation of the connection portions 105*a*, 105*b*, 105*d*, 105*e*. The force necessary for guiding the connection portions 105*a-f* between the parallel walls 3*a*, 3*b* would be too high if the connection portions 105*a-f* were arranged radially.

FIG. 8 shows the connection units 1*a*, 1*b* in their fastened position in which the fastening portions 8, 10 intermesh in a manner similar to that in FIG. 5. In this position, the contact portions 2*a-f* and the connection portions 105*a-f* may be joined together for example by welding.

FIG. 9 is a plan view of a third exemplary embodiment of a connection unit 1*a*. The connection unit 1*b*, also shown, corresponds to the second exemplary embodiment. All statements relating to the first exemplary embodiment in FIGS. 1 and 2 can be transferred to the third exemplary embodiment in FIG. 9 apart from the differences described below.

In the third exemplary embodiment of the connection unit 1*a*, the fastening portion 8 is formed by the conductor arrangement 5, which for this protrudes from the isolation body 6. According to an alternative exemplary embodiment, the fastening portion 10 of the connection unit 1*b* is formed by the conductor arrangement 5 when the fastening portion 8 of the connection unit 1*a* is formed by the isolation body 6, as in the first exemplary embodiment.

FIG. 10 is a plan view of a fourth exemplary embodiment of a connection unit 1*a* and a fifth exemplary embodiment of a connection unit 1*b*. All statements relating to the first and second exemplary embodiments in FIGS. 1 to 3 can be transferred to the fourth and fifth exemplary embodiments apart from the differences described below.

In the fourth exemplary embodiment of the connection unit 1*a*, the fastening portion 8 is formed by protrusions 15*a*, 15*b*. In the fifth exemplary embodiment of the connection unit 1*b*, the fastening portion 10 is formed by recesses 16*a*, 16*b* which are formed corresponding to the protrusions 15*a*, 15*b*. The protrusions 15*a*, 15*b* and the recesses 16*a*, 16*b* correspond with one another in the same way as two jigsaw pieces, in order to fasten the connection units 1*a*, 1*b* together by means of a form fit. In the fourth and fifth exemplary embodiments, the connection units 1*a*, 1*b* are also connected by intermeshing resulting from a linear movement, in order to create the form-fit connection. The movement direction of the linear movement, however, runs parallel to the extent direction of the connection portions 105*a-f.*

FIG. 11 shows a plan view of a further exemplary embodiment of the stator arrangement 100 according to the invention with a sixth exemplary embodiment of a connection unit 1*a* and a seventh exemplary embodiment of a connection unit 1*b*.

In the present exemplary embodiments, the connection units 1*a*, 1*b* have no fastening portions. The stator arrangement 100 comprises a fastening means 17 (illustrated schematically) via which the first connection unit 1*a* and the second connection unit 1*b* can be transferred from the detached position to the fastened position. For this, the fastening means 17 is configured to force the connection unit 1*a* and the connection unit 1*b* together in the fastened position by a force acting on the connection units 1*a*, 1*b*, so that in the fastened position, the connection portions 105*a-f* lie electrically conductively against the contact portions 2*a-f* and can then be fastened. This may be achieved for example by a substance-bonded connection, in particular by welding. The fastening means 17 is configured as an additional component separate from the connection units 1*a*, 1*b*. In the fastened position, in particular after the fastening of the connection portions 105*a-f* to the contact portions 2*a-f*, the fastening means can be removed so that the fastening means 17 does not remain on the stator arrangement 100.

Exemplary embodiments of a method for producing a stator arrangement 100, explained in more detail with reference to FIGS. 1 to 11, are described below.

According to a first exemplary embodiment of the method, a step of providing a first connection unit 1*a* and a step of providing a second connection unit 1*b* are performed. A further step of providing a stator 101 is also performed. The method furthermore comprises a step of arranging the first to the third connection portions 105*a*, 105*b*, 105*c* of the stator 101 in the receiving chamber 4 of a respective contact portion 2*a*, 2*b*, 2*c* of the connection unit 1*a*, and a step of arranging the fourth to the sixth connection portions 105*d*, 105*e*, 105*f* of the stator 101 in the receiving chamber 4 of a respective contact portion 2*d*, 2*e*, 2*f* of the connection unit 1*b*. The arrangement steps take place by performance of a relative movement of the first connection unit 1*a* and the second connection unit 1*b* along a movement direction running substantially perpendicular to the extent direction of the connection portions 105*a-f* when the connection units 1*a*, 1*b* correspond to the first to the third exemplary embodiments. When the connection units 1*a*, 1*b* correspond to the fourth and fifth exemplary embodiments, the movement direction is however parallel to the extent direction of the connection portions 105*a-f.* In the sixth and seventh exemplary embodiments, the movement direction is arbitrary.

The method furthermore comprises a step of transferring the first connection unit 1*a* and the second connection unit 1*b* from a detached position into a fastened position by means of the fastening means 17 or fastening portions 8, 10, wherein in the fastened position, the first connection unit 1*a* and the second connection unit 1*b* are fastened together and the conductor arrangement 5 of the first connection unit 1*a* and the conductor arrangement 5 of the second connection unit 1*b* are electrically isolated from one another.

The method furthermore comprises a step of joining the connection portions 105*af* and the contact portions 2*a-f* to form substance-bonded connections in the fastened position of the fastening portions 8, 10 or fastening means 17.

If the fastening means 17 according to FIG. 11 is used, then after the joining, the method may comprise the following step: removing the fastening means 17 by transfer from the fastened position to the detached position.

FIG. 12 is a basic diagram of a vehicle 200 with an exemplary embodiment of an electric machine 201, which is designed to drive the vehicle 200.

The electric machine 201 comprises a stator arrangement 100 according to one of the above-described exemplary embodiments, or a stator arrangement 100 obtained using the method, and a rotor 202 mounted rotatably inside the stator arrangement 100. The electric machine 201 is designed as part of a drive train of the vehicle 200. The electric machine 201 may be a synchronous machine. The rotor 202 is preferably permanently excited. Alternatively, the electric machine 201 may be an asynchronous machine.

The vehicle 200 may accordingly be a battery electric vehicle (BEV) or a hybrid vehicle.

The invention claimed is:

1. A stator arrangement for an electric machine, comprising:

a stator comprising a stator core with an axial end face, and a stator winding which has a number N of phases and is formed sectional from shaped conductors extending through the stator core, and from first to Nth connection portions which at the end face adjoin a part of the conductors, are situated at different angular positions of a circumferential direction and extend in the axial direction, and are configured either to form a star point or to form connections for the phases, wherein:

the connection portions have a pair of parallel side faces, and the first (N−1)th connection portions are deformed relative to the Nth connection portion such that the pair of parallel side faces of the first to the Nth connection portions are oriented parallel to one another;

a connection unit for the stator, comprising a number N of contact portions, wherein each contact portion has a first wall and a second wall, each contact portion forms a receiving chamber delimited by the first wall and the second wall and designed to encase one of the N connection portions of the stator, and each contact portion is configured to electrically conductive contact the connection portion, wherein the first and second walls of the N contact portions are oriented parallel to one other; and a conductor arrangement which either electrically conductively connects the contact portions or comprises N conductor portions which are electrically isolated from one another and are each electrically conductively connected to one of the N contact portions, wherein the first to the Nth connection portions are each received in the receiving chamber of a contact portion of the connection unit.

2. The stator arrangement as claimed in claim 1, wherein 1the contact portions are configured as recesses of the conductor arrangement.

3. The stator arrangement as claimed in claim 1, wherein the contact portions each have a guide which is widened relative to a distance between the first wall and the second wall.

4. The stator arrangement as claimed in claim 1, wherein the contact portions each have a third wall which connects the first wall and the second wall and delimits the receiving chamber.

5. The stator arrangement as claimed in claim 1, further comprising an isolation body which is arranged on the conductor arrangement and comprises openings exposing the contact portions.

6. The stator arrangement as claimed in claim 1, wherein the first to the Nth connection portions are designed to form a star point, wherein the stator winding is furthermore formed sectional from (N+1)th to (2N)th connection portions which at the end face adjoin a part of the shaped conductors, extend in the axial direction at different angular positions of a circumferential direction, and are configured to form connections for the phases, wherein the (N+1)th to (2N)th connection portion has a pair of parallel side faces, and wherein the (N+1)th to (2N−1)th connection portions are deformed relative to the (2N)th connection portion such that the pairs of parallel side faces of the (N+1)th to (2N)th connection portions are oriented parallel to one another.

7. A stator arrangement for an electric machine, comprising:

a stator comprising a stator core with an axial end face, and a stator winding which has a number N of phases and is formed sectional from shaped conductors extending through the stator core, and from first to Nth connection portions which at the end face adjoin a part of the conductors, are situated at different angular positions of a circumferential direction and extend in the axial direction, and are configured either to form a star point or to form connections for the phases, wherein:

the connection portions have a pair of parallel side faces, and the first (N−1)th connection portions are deformed relative to the Nth connection portion such that the pair of parallel side faces of the first to the Nth connection portions are oriented parallel to one another;

a connection unit for the stator, comprising a number N of contact portions, wherein each contact portion has a first wall and a second wall, each contact portion forms a receiving chamber delimited by the first wall and the second wall and designed to encase one of the N connection portions of the stator, and each contact portion is configured to electrically conductive contact the connection portion, wherein the first and second walls of the N contact portions are oriented parallel to one other; and a conductor arrangement which either electrically conductively connects the contact portions or comprises N conductor portions which are electrically isolated from one another and are each electrically conductively connected to one of the N contact portions, wherein the first to the Nth connection portions are each received in the receiving chamber of a contact portion of the connection unit, wherein the connection portions are deformed by twisting around an axis parallel to a longitudinal axis of the stator.

8. The stator arrangement as claimed in claim 1, wherein the conductor arrangement of the first connection unit electrically conductively connects the contact portions to form a star point, wherein the stator arrangement furthermore comprises: a second connection unit the conductor arrangement of which comprises N conductor portions which are electrically isolated from one another and each electrically conductively connected to one of the N contact portions so as to form a connection for one of the phases, wherein the (N+1)th to the (2N)th connection portions are each received in the receiving chamber of a contact portion of the second connection unit.

9. The stator arrangement as claimed in claim 8, wherein a fastening means is provided via which the first connection unit and the second connection unit can be transferred from a detached position into a fastened position, in which the first connection unit and the second connection unit are fastened together and the conductor arrangement of the first connection unit and the conductor arrangement of the second connection unit are electrically isolated from one another.

10. A method for producing a stator arrangement, comprising the following steps:

providing the stator and the connection unit as claimed in claim 1;

arrangement of the first to the Nth connection portions of the stator in the receiving chambers of the contact portions of the connection unit, in particular by performing a relative movement of the connection unit along a movement direction running substantially perpendicular to an extent direction of the connection portions, and joining of the connection portions and the contact portions.

11. The method as claimed in claim 10, furthermore comprising the following steps:

provision of a second connection unit, the conductor arrangement of which comprises N conductor portions which are electrically isolated from one another and each electrically conductively connected to one of the N contact portions in order to form a connection for one of the phases;

arrangement of the (N+1)th to the (2N)th connection portions of the stator in the receiving chambers of the contact portions of the second connection unit, in particular by performing a relative movement of the second connection unit along a movement direction running substantially perpendicular or parallel to an extent direction of the connection portions.

12. The method as claimed in claim 11, furthermore comprising the following step:

transfer of the first connection unit and the second connection unit from a detached position into a fastened position by means of a fastening means or by means of fastening portions formed by the connection units, wherein in the fastened position, the first connection unit and the second connection unit are fastened together and the conductor arrangement of the first connection unit and the conductor arrangement of the second connection unit are electrically isolated from one another, wherein in particular a step is provided of removing the fastening means by transfer from the fastened position into the detached position after joining of the connection portions and the contact portions.

13. An electric machine for a driving a vehicle, having a stator arrangement as claimed in claim 1 a rotor rotatably mounted inside the stator.

* * * * *